United States Patent [19]

Sugitani

[11] Patent Number: 4,947,370

[45] Date of Patent: Aug. 7, 1990

[54] WORD PROCESSOR FOR SIMULTANEOUSLY DISPLAYING AND SCROLLING DOCUMENTS AND THE CORRESPONDING TITLES

[75] Inventor: Kazunori Sugitani, Tokyo, Japan

[73] Assignee: Canon Kabushiki Kaisha, Tokyo, Japan

[21] Appl. No.: 320,874

[22] Filed: Mar. 10, 1989

Related U.S. Application Data

[63] Continuation of Ser. No. 41,622, Apr. 22, 1987, abandoned, which is a continuation of Ser. No. 534,313, Sep. 21, 1983, abandoned.

[30] Foreign Application Priority Data

Sep. 27, 1982 [JP] Japan .................. 57-166684

[51] Int. Cl.$^5$ .............................................. G06F 3/153
[52] U.S. Cl. ................................. 364/900; 364/928.2; 364/943.43; 364/927.62; 364/419; 340/724; 400/63
[58] Field of Search ... 364/200 MS File, 900 MS File, 364/144, 419; 371/29; 340/721, 724, 726, 792; 400/63, 76

[56] References Cited

U.S. PATENT DOCUMENTS

| | | | |
|---|---|---|---|
| 3,872,460 | 3/1975 | Fredrickson et al. | 340/748 X |
| 3,976,995 | 8/1976 | Sebestyen | 340/711 |
| 4,160,981 | 7/1979 | Raney, Jr. | 340/726 X |
| 4,249,172 | 2/1981 | Watkins et al. | 340/726 |
| 4,342,991 | 8/1982 | Pope et al. | 340/726 |
| 4,434,475 | 2/1984 | McCaskill et al. | 364/900 |
| 4,447,872 | 5/1984 | Nothaft | 364/200 |
| 4,504,900 | 3/1985 | Yomogida et al. | 364/900 X |
| 4,725,158 | 2/1988 | Ueda et al. | 400/63 |

*Primary Examiner*—Thomas C. Lee
*Attorney, Agent, or Firm*—Fitzpatrick, Cella, Harper & Scinto

[57] ABSTRACT

An information processor having a first memory for storing a plurality of documents and for storing a title corresponding to each of the documents. The information processor is operable to read out the plurality of documents from the first memory. The processor also includes a keyboard for generating an instruction for recalling the plurality of documents and the title corresponding to each of the plurality documents from the first memory. The keyboard also generates a scroll instruction for scrolling the plurality of documents recalled by the recall instruction. The processor also includes a recall control responsive to an instruction generated by the keyboard for recalling from the first memory a portion of each of the plurality of documents and the title corresponding to each of the plurality of documents. The processor also includes a second memory for storing the plurality of documents and the title corresponding to each of the documents recalled by the recall control. The processor further includes a display for simultaneously displaying the plurality of documents and the title corresponding to each of the documents read from the second memory means. The processor also includes a scroll control responsive to an instruction generated by the keyboard for causing scrolling to another new portion of the plurality of documents succeeding the portion of the plurality of documents as initially displayed by the display.

12 Claims, 6 Drawing Sheets

| TITLE OF DOCUMENT | | | LABEL | LIST OF DOCUMENT | | | |
|---|---|---|---|---|---|---|---|
| DOCU | MENT | 3 | A | 1 | 2 | 3 | 4 |
| DOCU | MENT | 2 | A | α | β | γ | δ |
| DOCU | MENT | 1 | B | α | β | γ | δ |
| DOCU | MENT | 5 | C | a | i | u | e |
| DOCU | MENT | 4 | D | a' | i' | u' | e' |

FIG. 3A

| TITLE OF DOCUMENT | | LABEL | | LIST OF DOCUMENT | | | |
|---|---|---|---|---|---|---|---|
| DOCUMENT | 3 | A | | 1 | 2 | 3 | 4 |
| DOCUMENT | 2 | A | | α | β | γ | δ |
| DOCUMENT | 1 | B | | α | β | γ | δ |
| DOCUMENT | 5 | C | | a | i | u | e |
| DOCUMENT | 4 | D | | a' | i' | u' | e' |

FIG. 3B

| | | | | | | | |
|---|---|---|---|---|---|---|---|
| DOCUMENT | 1 | B | | α | β | γ | δ |
| DOCUMENT | 2 | A | | α | β | γ | δ |
| DOCUMENT | 3 | A | | 1 | 2 | 3 | 4 |
| DOCUMENT | 4 | D | | a' | i' | u' | e' |
| DOCUMENT | 5 | C | | a | i | u | e |

FIG. 3C

| α | β | γ | δ | ε | ζ | η | θ | ι | κ |
|---|---|---|---|---|---|---|---|---|---|
| α | β | γ | δ | α | ·α | α | α | α | α |
| 1 | 2 | 3 | 4 | | | | | | |
| a' | i' | u' | e' | | | | | | |
| a | i | u | e | | | | | | |

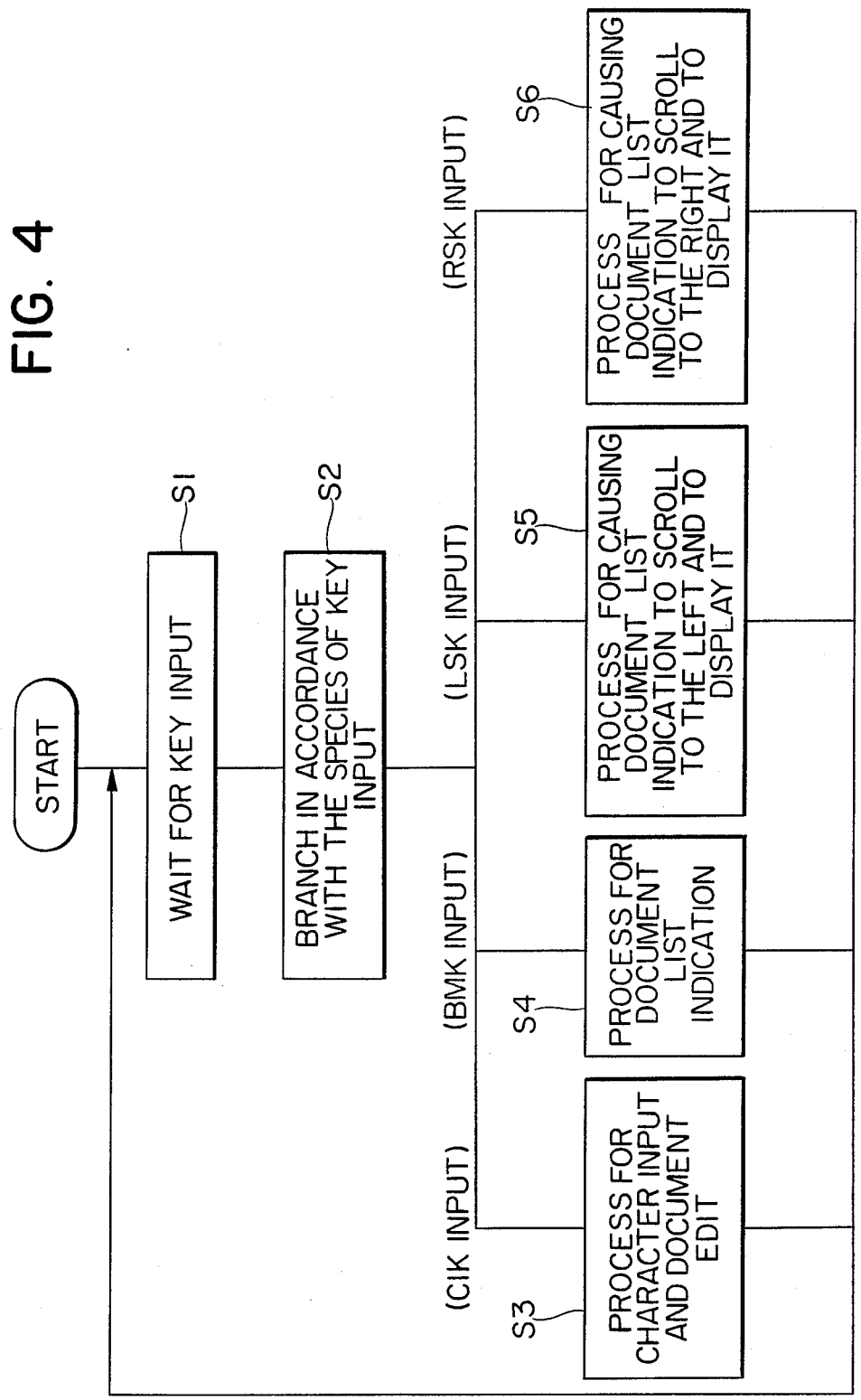

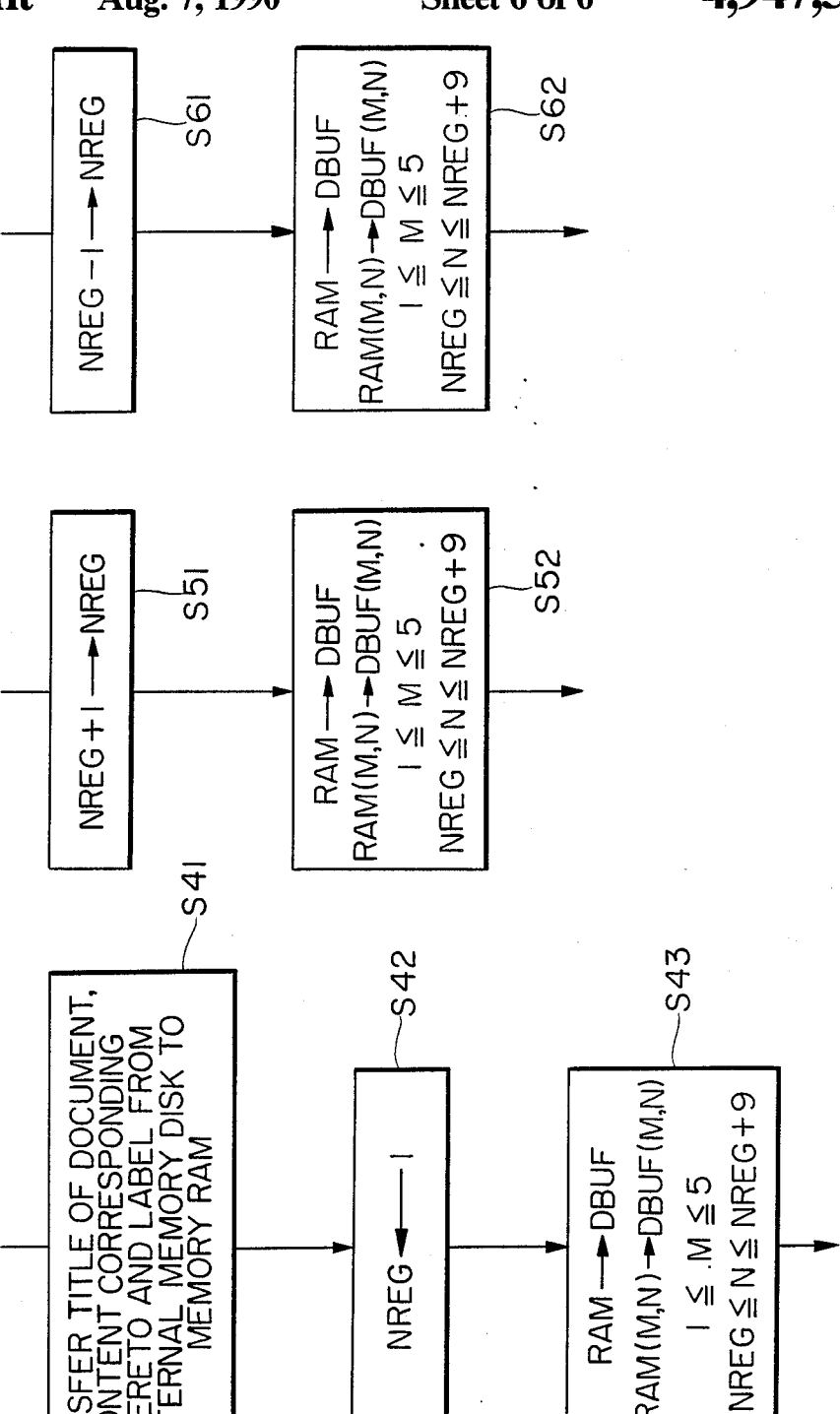

WORD PROCESSOR FOR SIMULTANEOUSLY DISPLAYING AND SCROLLING DOCUMENTS AND THE CORRESPONDING TITLES

This application is a continuation of application Ser. No. 041,622, filed Apr. 22, 1987, now abandoned, which was a continuation of Ser. No. 534,313, filed Sept. 21, 1983, now abandoned.

BACKGROUND OF THE INVENTION

1. Field of the Invention

The present invention relates to a word processor capable of processing characters and storing rows of characters in an external memory, and more particularly to a word processor capable of displaying a list of the texts stored in the external memory.

2. Description of the Prior Art

There is already known a word processor capable of calling and displaying a list of the texts in an external memory. In such word processor, the information used to constitute the list of texts is usually the name of each text or a part of the text, but such limited information often gives rise to difficulty in the discrimination of the texts in case the titles and the contents of texts are alike.

SUMMARY OF THE INVENTION

An object of the present invention is to provide a word processor which is not characterized by the above-described drawback and which is capable, upon display of a list of texts stored in an external memory, of displaying the content of each text in scrolling manner for a desired number of characters from the start of said text in combination with the title of said text, whereby the operator can compare the contents of different texts and can easily make a distinction therebetween.

Another object of the present invention is to provide a word processor in which each external memory for storing texts is given an identifying label different from those of other memories and which is capable, upon display of a list of texts, of displaying said labels in corresponding manner to the titles of the texts, whereby the operator can easily identify the external memory in which each text is stored and can thus easily control the text storage.

Still another object of the present invention is to provide a word processor which is capable of recalling the list of texts stored in the external memories as an independent text and applying usual word processing operations to said list of texts.

BRIEF DESCRIPTION OF THE DRAWINGS

FIGS. 3A, 3B and 3C are views of displays on a cathode ray tube showing examples of functions of the word processor of the present invention;

FIG. 4 is a flow chart showing an example of control procedure in the word processor of the present invention;

FIGS. 6, 7 and 8 are flow charts showing the details of steps S4, S5 and S6, respectively, shown in FIG. 4.

DETAILED DESCRIPTION OF THE PREFERRED EMBODIMENTS

Now the present invention will be explained in detail by an embodiment thereof shown in the attached drawings.

Figure 1:
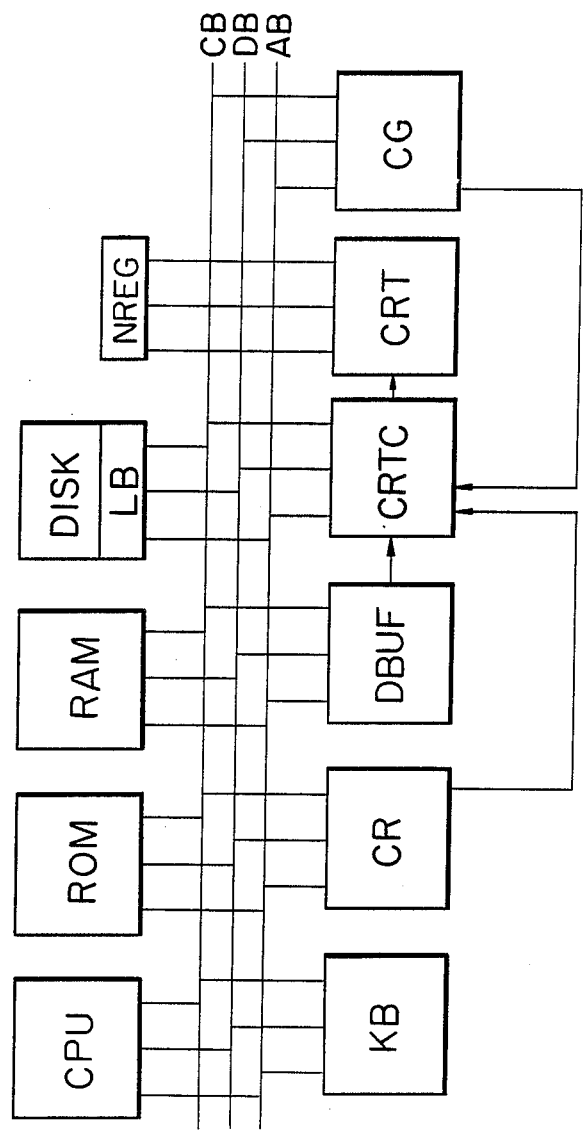
FIG. 1 is a block diagram showing an embodiment of the present invention.

FIG. 1 shows an embodiment of the structure of the word processor of the present invention, wherein a microprocessor CPU executes calculations, logic judgments etc. for word processing and controls various components connected to an address bus AB, a control bus CB and a data bus DB through these buses. The address bus AB transfers address signals for indicating the components to be controlled by the microprocessor CPU. The control bus CB transfers control signals to various components to be controlled by the microprocessor CPU. The data bus DB performs transfer of data between various components.

A read-only memory ROM stores for example a control procedure of the microprocessor CPU to be explained later in relation to FIG. 4. A random access memory RAM of 16 bits/word is used for storing character information such as texts and a list thereof.

Figure 5A:
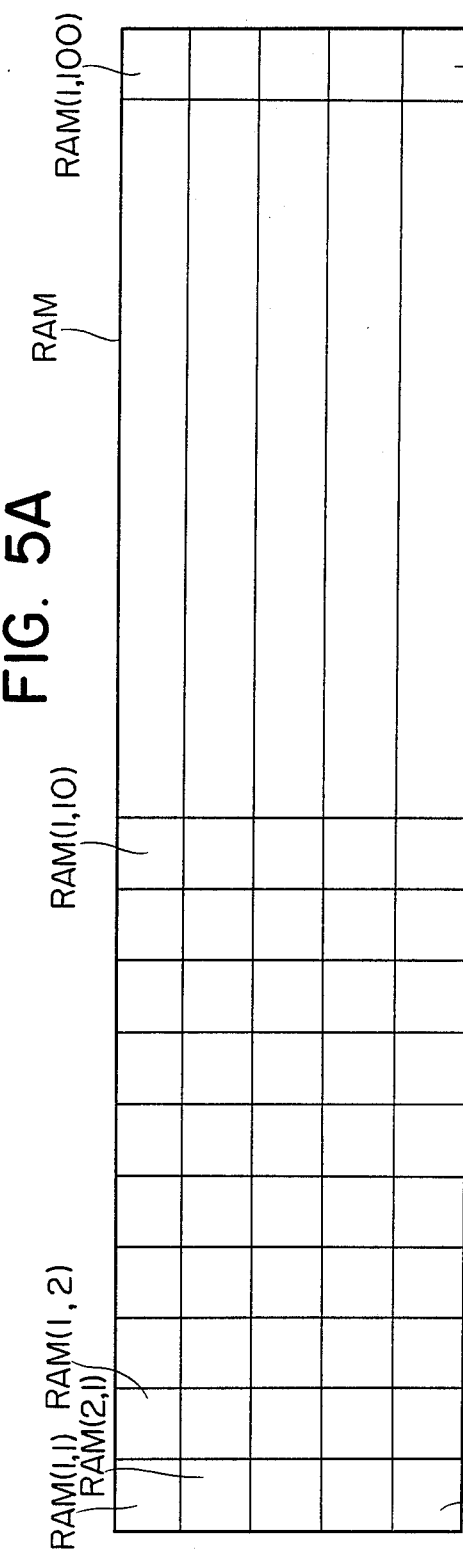
FIGS. 5A and 5B are schematic views showing the structure respectively of a random access memory and a data buffer memory employed in the word processor of the present invention.

The random access memory RAM has a capacity of $5 \times 100$ words or characters and is constructed as a matrix as shown in FIG. 5A, which is divided into five areas of 100 words each. The stored data are numbered in the order of RAM (1, 1), RAM(1, 2), ..., RAM(1, 100), RAM(2, 1), ... to constitute a matrix of $5 \times 100$. The data in M-th row and in N-th column are hereinafter represented as RAM(M, N), wherein $1 \leq M \leq 5$ and $1 \leq N \leq 100$.

Figure 2:
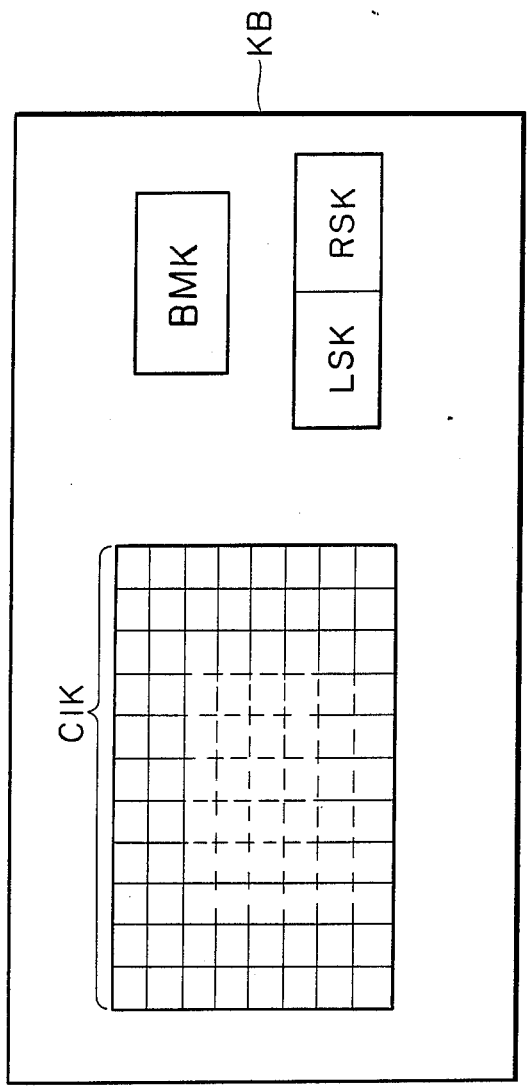
FIG. 2 is a schematic plan view showing the arrangement in a keyboard employed therein.

A keybaord KB is provided with various keys for entering various data and instructions to the word processor, the keys being arranged for example as shown in FIG. 2.

A register NREG is used as a pointer for reading data from the random access memory RAM.

A cursor register CR stores and releases data relative to the position of a cursor under the control of the microprocessor CPU, and the cursor is displayed on a display unit CRT at a position corresponding to the address stored in said cursor register CR, under the control of a CRT controller CRTC.

A data buffer memory DBUF stores a part of the character information stored in the memory RAM, and displays the partial character information on the display unit CRT under the control of the CRT controller CRTC. The buffer memory DBUF is used as the refreshing memory for the display unit CRT and can perform data write-in and read-out under the control of the microprocessor CPU.

Figure 5B:
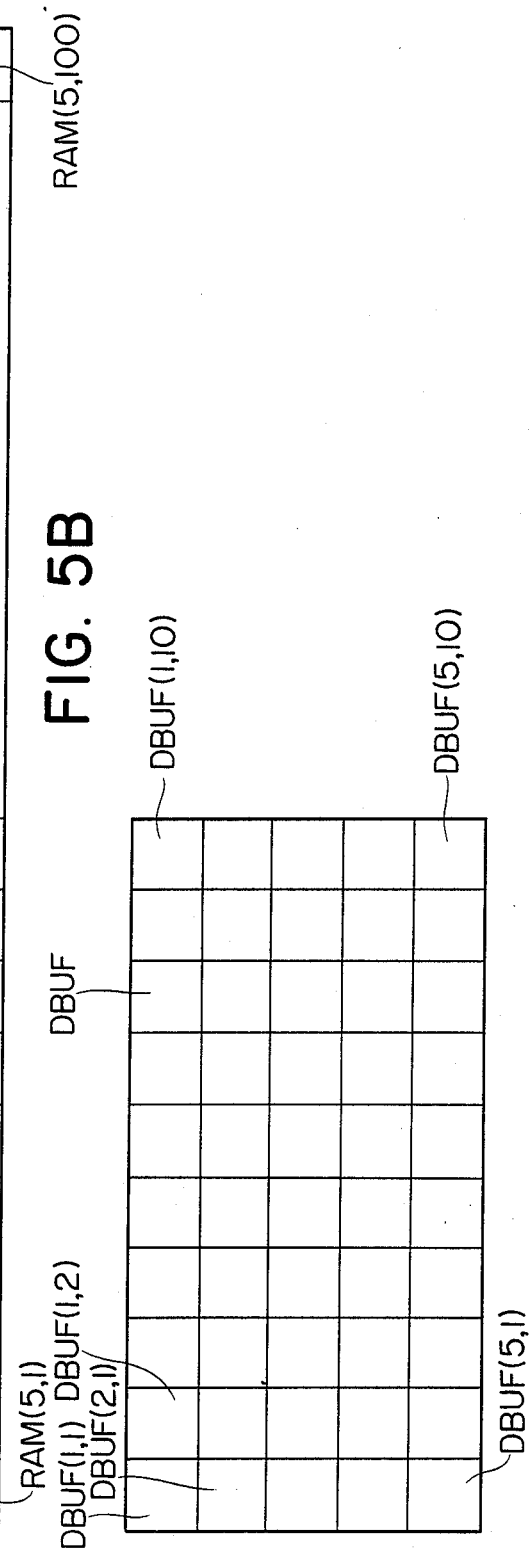

The data buffer DBUF has a capacity of $5 \times 10$ words for display on the display unit CRT. The obtainable display consists of 5 horizontal rows of 10 character each, corresponding in succession to the contents of the data buffer DBUF. The data buffer DBUF has a matrix structure similar to that of the random access memory RAM. As shown in FIG. 5B, the stored data are numbered as DBUF(1, 1), DBUF(1, 2), ..., DBUF(1, 10), DBUF(2, 1), ... Data in M-th row and in N-th column are represented as DBUF(M, N), wherein $1 \leq M \leq 5$ and $1 \leq N \leq 10$.

Data DBUF(M, N) are displayed in the M-th row in the N-th column on the display unit CRT. The data to be stored in the data buffer DBUF are transferred from the random access memory RAM under the control of the microprocessor CPU, and the transfer is conducted in such a manner that a partial block in the matrix of the random access memory RAM is transferred without alteration to the data buffer DBUF.

More specifically, when data RAM(1, 1) are transferred into the data buffer as DBUF(1, 1), the data RAM(M, N) are transferred as DBUF(M, N).

The CRT controller CRTC controls the display of the cursor and other patterns on the display unit CRT according to the cursor position stored in the cursor register CR and the character code signals stored in the data buffer memory DBUF. The display unit CRT is composed for example of a cathode ray tube, on which the dot-constructed displays and cursor display are controlled by the CRT controller CRTC.

A character generator CG generates character signals of characters, symbols, the cursor etc. to be displayed on the display unit CRT, wherein each character or symbol is composed for example of 16×16 dots.

A detachable external memory DISK is used for storing texts. Each memory DISK is provided with a memory area for storing a label LB for identification of said memory.

FIG. 2 shows an example of the arrangement of the keyboard KB shown in FIG. 1, wherein provided are keys CIK including character keys and function keys for word processing; a text list key BMK for displaying a list of texts; a left scroll key LSK for scrolling the list toward the left; and a right scroll key RSK for scrolling the list toward the right.

Now there will be given an explanation of the outlined function of the word processor of the present invention as shown in FIG. 1, while making reference to FIGS. 3A, 3B and 3C representing displays on the display unit CRT. CM shown in FIG. 3A represents the cursor.

All the functions of the word processor of the present invention are controlled by the character keys and function keys on the keyboard KB.

At the start of power supply, the word processor is in a character input mode, in which the word processing operations are conducted with the keys on the keyboard KB.

In order to display the list of texts or documents, the document list key BMK on the keyboard KB is actuated, whereby the titles of documents, labels of memories DISK and the first four characters of each document are displayed as a list as shown in FIG. 3A.

In case the operator wishes to change the order of rows in the document list shown in FIG. 3A, the character and function keys CIK on the keyboard KB are suitably actuated to obtain a rearranged list as shown in FIG. 3B.

As shown in FIG. 3B as an example, the document "1" and document "2" have same four first characters "αβγδ" and are therefore mutually undistinguishable. In such case the left scroll key LSK is actuated to display the first ten characters as shown in FIG. 3C, thus enabling identification of the difference in the contents of the documents. The state shown in FIG. 3B can be restored by actuating the right scroll key RSK.

Each external memory storing the documents is given a label LB for identification and to distinguish it from other memories DISK.

FIG. 3A shows a display of labels A, A, B, C, D from top to bottom, indicating a fact that the documents "3" and "2" are both stored in an external memory DISK identified by a label A.

Now reference is made to the flow charts shown in FIGS. 4, 6, 7 and 8 for explaining the detailed procedure of document list recalling, editing, and left or right scrolling in the word processor of the present invention.

After the start of power supply, if a key signal entry is made on the keyboard KB while the key entry is awaited in a step S1, a step S2 is executed to identify the species of the actuated key.

If the actuated key is identified as a character or function key CIK, a step S3 is executed to effect character entries and various editing processes.

In case a character is entered from the keyboard KB, the display position of the cursor on the cathode ray tube is used to find a corresponding address in the data buffer memory DBUF, at which the entered character is memorized. Also the content of the data buffer DBUF corresponding to thus entered character is transferred to the corresponding position in the random access memory RAM.

Also in case editing in the unit of a row, for example interchange of rows as shown in FIGS. 3A and B, is conducted in the step S3, a row interchange is made in the random access memory RAM simultaneously with the row interchange in the data buffer DBUF.

In this manner the data arrangement, in rows and columns, is always the same in the random access memory RAM and in the data buffer DBUF. Upon completion of the above-described process in the step S3, the program returns to the step S1 to await the key entry.

On the other hand, in case the document list key BMK is actuated, the program proceeds from the step S2 to a step S4 of which details are shown in FIG. 6. As shown in this flow chart, a step S41 stores the title of a document stored in the external memory DISK, the label of the memory and the first ninety four characters of the content of the document into a row of the random access memory RAM and repeats this procedure. A step S42 sets "1" into the register NREG, and a step S43 transfers data of a determined amount from the memory RAM to the data buffer DBUF, thereby displaying the document list on the display unit CRT as shown in FIG. 3A. After the completion of the above-described procedure, the program returns again to the step S1 for awaiting the key entry.

In case the left scroll key LSK is actuated, the data buffer DBUF receives data, with a shift by one digit to the left, from the random access memory RAM, in a step S5 of which details are shown in FIG. 7. In this procedure, a step S51 executes a stepwise increment of the content of the register NREG, and a step S52 transfers the data from the memory RAM to the data buffer DBUF from a starting position defined by the content of the register NREG. Consequently the data DBUF(M, N) of the data buffer become equal to the data RAM(M, N+1) of the random access memory, wherein $1 \leq M \leq 5$ and $1 \leq N \leq 99$. It is to be noted that, if the data RAM(1, 1) are transferred as the data DBUF(1, 1), the data RAM(M, N) are transferred as the data DBUF(M, N), wherein $1 \leq M \leq 5$ and $1 \leq N \leq 10$.

Consequently, upon actuation of the left scroll key LSK six times, the display shown in FIG. 3B is changed to a state shown in FIG. 3C, with leftward scrolling of six digits.

In case the right scroll key RSK is actuated, the program proceeds from the step S2 to a step S6 to execute a procedure shown in FIG. 8, which is the inverse of the case explained above. Upon completion of the procedure of the above-mentioned step S5 or S6, the program returns to the step S1 for awaiting the key entry.

In the foregoing embodiment the random access memory RAM is assumed to have a structure of 5×100 words, but the number of rows and columns may be selected arbitrarily. It is therefore possible also to expand the data buffer DBUF and the corresponding display area of the display unit CRT, thus enabling the display of texts of a larger amount.

The cathode ray tube employed as the display unit CRT in the foregoing embodiment may be replaced by other display devices, for example a liquid crystal display.

In the foregoing embodiment the title of a document is assumed to be composed of three characters, but a modification is naturally possible so as to accept a longer title.

Also the display of the document list need not necessarily be instructed by a key but may be done by other suitable means, for example by a command word composed of determined characters.

As explained in the foregoing, the present invention enables, at the display of a list of documents stored in external memories, to simultaneously display the initial part of each document, and to scroll the display in a lateral direction, thereby allowing the comparison of the contents of different documents and facilitating the distinction of different texts.

What I claim is:

1. An information processor having first memory means for storing plural documents and a title corresponding to each of the documents, said information processor reading out the plural documents from said first memory means, said information processor comprising:
    input means including recall instruction means for generating an instruction for recalling the plural documents and the title corresponding to each of the plural documents from said first memory means and scroll instruction means for generating a scroll instruction for scrolling the plural documents recalled by said recall instruction means;
    recall control means responsive to an instruction generated by said recall instruction means for recalling from said first memory means a portion of each of the plural documents and the title corresponding to each of the plural documents;
    second memory means for storing the plural documents and the title corresponding to each of said documents recalled by said recall control means;
    display means for simultaneously displaying the plural documents and the title corresponding to each of the documents read out from said second memory means; and
    scroll control means responsive to an instruction generated by said scroll instruction means for simultaneously scrolling to another new portion of the plural documents succeeding the portion of the plural documents as initially displayed by said display means.

2. An information processor according to claim 1, wherein said recall instruction means is a single key switch.

3. An information processor according to claim 1, wherein said display means comprises a display unit constructed to display a plurality of lines of information.

4. An information processor according to claim 1, wherein said scroll control means is responsive to the designation of an instruction generated by said scroll instruction means to shift the content of the plural documents one character at a time.

5. An information processor according to claim 1, wherein said display means is constructed to display a plurality of lines of information and displays the title of a document and the content of that document related to that title on one line of the plurality of lines.

6. An information processor having first memory means for storing plural documents and a title corresponding to each of the documents, said information processor reading out the plural documents from said first memory means, said information processor comprising:
    input means comprising recall instruction means for generating an instruction for recalling the plural documents and the title corresponding to each of the documents stored in said first memory means and scroll instruction means for generating an instruction for scrolling the plural documents recalled by said recall instruction means;
    recall control means responsive to a recall instruction generated by said recall instruction means for recalling a portion of the content of each document of the plural documents and the corresponding title from said first memory means;
    second memory means for storing said plural documents and the title corresponding to each of the documents recalled from said first memory means by said recall control means;
    display means for displaying at the same time the plural documents and the title corresponding to each of the documents recalled from said second memory means; and
    scroll control means responsive to an instruction generated by said scroll instruction means for scrolling simultaneously of a portion of the content of the plural documents and the title displayed by said display means.

7. An information processor according to claim 6, wherein said display means displays said plural documents arranged in predetermined lines.

8. An information processor according to claim 7, wherein said scroll content means causes lateral scrolling of the content of said display means in at least one of the left and right directions.

9. An information processor according to claim 6, wherein said scroll instruction means comprises a scroll key.

10. An information processor according to claim 6, wherein said recall instruction means comprises a single key.

11. An information processor for storing plural documents and a title corresponding to each of the documents in a first memory means and for reading out the plural documents from the first memory means, said information processor comprising:
    input means for inputting instructions, said input means including recall instruction means for generating an instruction for recalling the title corresponding to each of the plural documents from the first memory means and scroll instruction means for generating a scroll instruction for scrolling each of the plural documents corresponding to the title recalled by said recall instructions means;

recall control means responsive to an instruction generated by said recall instruction means for recalling from the first memory means a portion of each of the plural documents and the title corresponding to each of the plural documents;

second memory means for storing the plural documents and the title corresponding to each of the documents recalled by said recall control means;

display means for simultaneously displaying the plural documents read out from said second memory means and the title corresponding to each of the documents read out from said second memory means; and scroll control means responsive to an instruction generated by said scroll instruction means for simultaneously scrolling to another new portion of displayed documents succeeding the portion of the displayed documents as initially displayed by said display means.

12. An information processor according to claim 11, wherein said recall control means recalls the title corresponding to each of the plural documents and then recalls the document corresponding to the title.

* * * * *

UNITED STATES PATENT AND TRADEMARK OFFICE
CERTIFICATE OF CORRECTION

PATENT NO. : 4,947,370

DATED : August 7, 1990

INVENTOR(S) : Kazunori Sugitani

It is certified that error appears in the above-identified patent and that said Letters Patent is hereby corrected as shown below:

On the title page:

[56] References Cited:

U.S. PATENT DOCUMENTS

Insert: --4,636,848  1/1987  Yamamoto ... 358/102--.

COLUMN 1:

Line 64, "structure" should read --structures--.

COLUMN 4:

Line 21, "B," should read --3B,--.

UNITED STATES PATENT AND TRADEMARK OFFICE
CERTIFICATE OF CORRECTION

PATENT NO. : 4,947,370

DATED : August 7, 1990

INVENTOR(S) : Kazunori Sugitani

It is certified that error appears in the above-identified patent and that said Letters Patent is hereby corrected as shown below:

COLUMN 5:

Line 57, "for si-" should read -- for scrolling si- --.

Line 58, "scrolling" should be deleted.

COLUMN 6:

Line 47, "content means" should read --control means--.

COLUMN 8:

Line 4, "for si-" should read -- for scrolling si- --.

Line 5, "scrolling" should be deleted.

Signed and Sealed this

First Day of December, 1992

Attest:

DOUGLAS B. COMER

*Attesting Officer*

*Acting Commissioner of Patents and Trademarks*